2,794,536

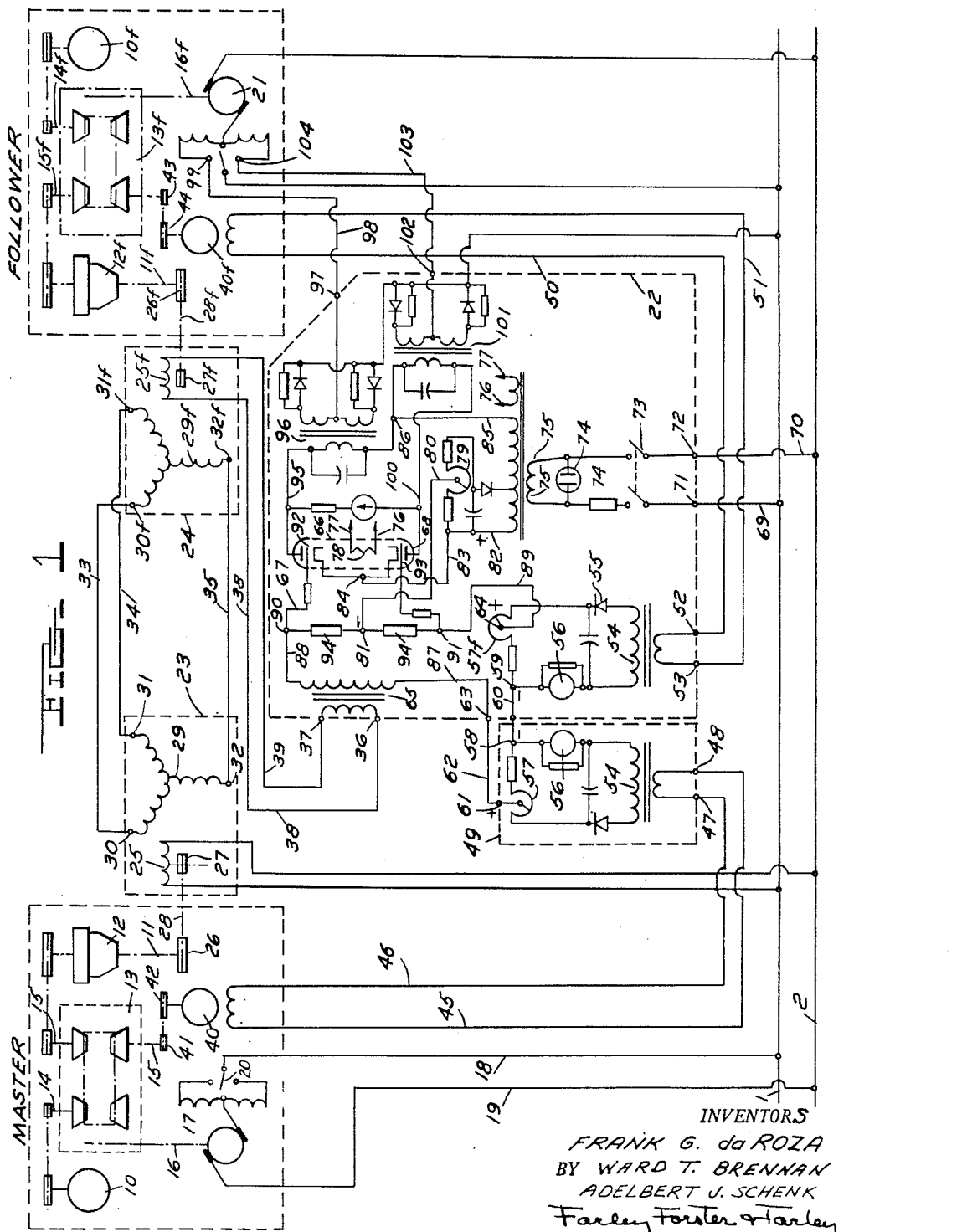

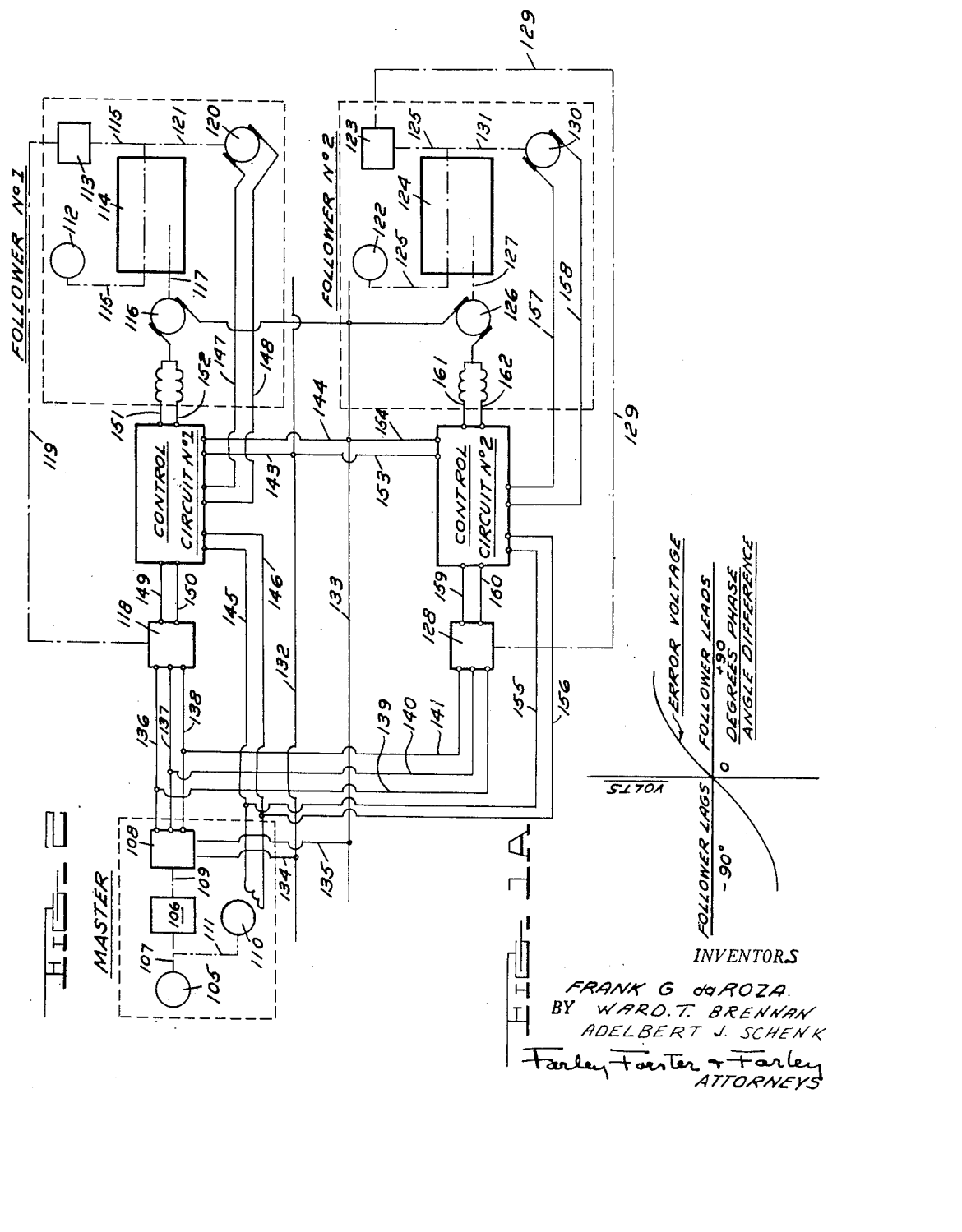

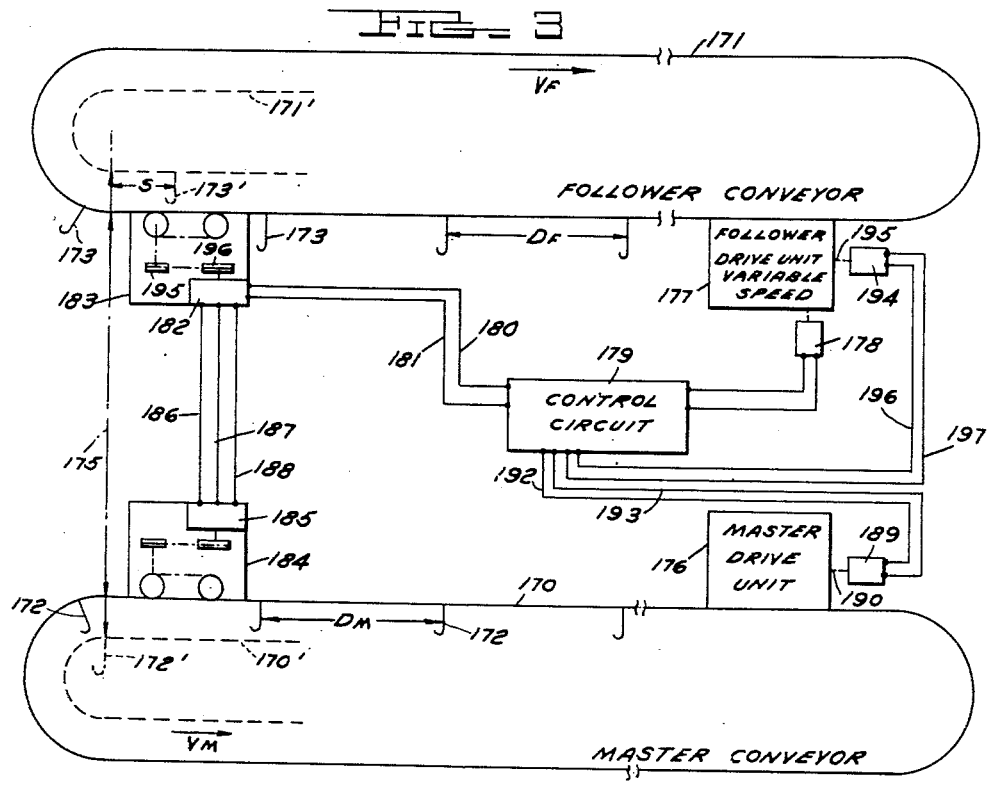
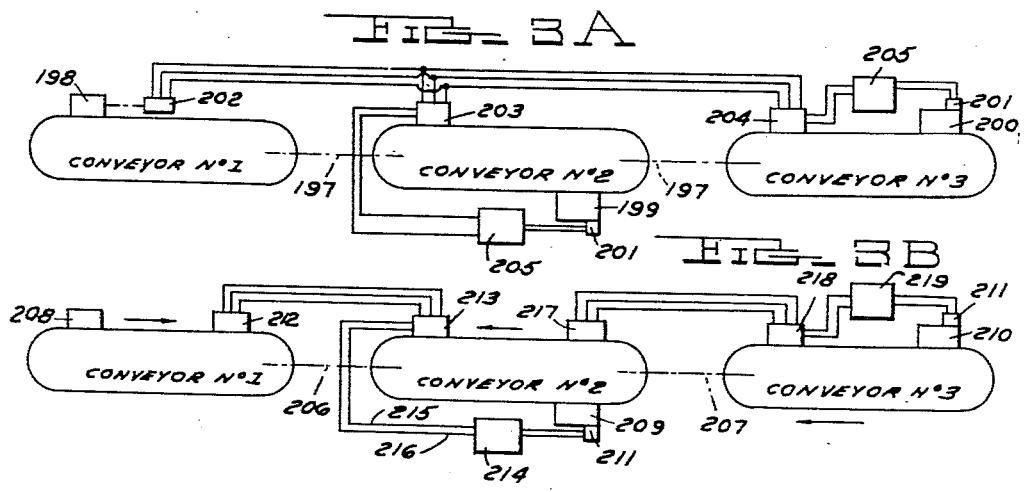
INVENTORS
FRANK G. da ROZA
WARD T. BRENNAN
ADELBERT J. SCHENK
BY Farley Forster & Farley
ATTORNEYS

United States Patent Office 2,794,536
Patented June 4, 1957

SYNCHRONIZATION OF INDEPENDENTLY DRIVEN MEMBERS

Frank G. da Roza, Detroit, Ward T. Brennan, Mount Clemens, and Adelbert J. Schenk, Huntington Woods, Mich., assignors to Jervis B. Webb Company, Detroit, Mich., a corporation of Michigan Application August 9, 1951, Serial No. 241,034

8 Claims. (Cl. 198—82)

This invention relates to a system for establishing and maintaining a synchronous speed relationship between a plurality of independently driven members. The term "relationship" will usually refer to a speed ratio between one driven member acting as a master and another independently driven member, acting as a follower; and by the employment of the system of the invention, this ratio may be of any desired value, either greater or less than one. The term "synchronous" is used in the sense that the independently driven follower member will operate as though mechanically linked to the master member and will not only operate at any instant at the desired speed ratio of the velocity of the master, but over a period of time the desired relationship will exist with respect to the relative distance travelled by a point on the master and a point on the follower. In other words, if the master and follower members are rotating shafts, the follower shaft, in any increment of time, will rotate the same amount as the master shaft in that increment of time multiplied by the speed ratio established between the shafts. If master and follower are lineal moving members, their distance of movement in any increment of time will bear the constant relationship of the speed ratio.

Illustrative examples will be given herein of the application of invention to both the synchronization of a plurality of independently driven rotating members and to the synchronization of a plurality of independently driven lineal moving members. In either instance one member is selected as a master whose operation is to govern the operation of another member designated a follower. Some means for controlling output speed is incorporated as a part of the follower driving unit and the system then synchronizes the speed of the follower to that established by the master, with a servo device being employed to actuate the output speed controlling means of the follower. The master driving unit may also be of a variable speed type, in which case the master unit may either be a small unit employed as a controller for remotely governing the speed of an independently driven member or plurality of independently driven members, or may be a larger working unit employed as a pace setter for an entire system of interrelated independently driven members.

The invention can be applied to govern the operation of systems of independently driven interrelated members in either or both of two general ways—either in series or in parallel. In series operation, each follower driving unit serves as a master governing the synchronous operation of a successive follower unit, whereas, in parallel, a plurality of follower units are each maintained in synchronism with the speed of a single master.

The application of the invention is not dependent upon the relative size of the particular driving units involved, nor upon their relative location, nor upon the size or type of the prime mover used with any particular driving unit of the system. Furthermore, the invention makes possible the direct synchronization of driven members with respect to any desired common reference point independently of the location of such reference point relative to the particular driving unit, or to the type of motion transmitting means employed between the driving unit and such reference point.

In the examples of the application of the invention to be given herein, the invention will first be described as applied to the synchronization of the rotating output member of two or more driving units, and also to the synchronization of the relative speed and position of a plurality of independently propelled lineal moving members, conveyors being selected to illustrate this application.

In the first instance, the master unit may be considered as essentially an output shaft whose speed is to determine a speed condition in a follower or plurality of follower units. Each follower unit will include a prime mover, an output shaft, means for controlling the speed of the output shaft, and a servo device for regulating the speed of the output shaft by actuation of the speed controlling means. The speed controlling means is herein illustrated in the form of a variable ratio transmission, and the servo device thereupon controls the speed of the output shaft of the follower unit by regulating the operating ratio of such transmission. Operation of the servo device is in turn regulated by the sensing portion of the system, sometimes referred to as the outside loop of a servo system, and which includes similar control elements operated by both the master and the follower driving units.

The main control element is a device for measuring the cumulative velocity error between the output shaft of master and follower. In the preferred embodiment of the invention, this control element consists of two synchros, one operating as a generator from the output shaft of the master and the other operating as a control transformer from the output shaft of the follower. Operation of synchros in this manner is well known and forms no part of the present invention except in its application to the present system of control. Briefly, however, when two synchros are operated in this manner, as long as the phase angle difference between the rotor of the control transformer compared to the rotor of the generator is zero, the voltage induced in the winding of the control transformer is zero. If this relative phase angle becomes leading, a voltage of one phase is induced in the winding of the control transformer, and if lagging, a voltage of the opposite phase is induced with the magnitude of the induced voltage in either case being proportional to the sine of the phase angle difference.

The second control element is an antihunt, or error-signal damping means. Such means are a well-known part of practically all servo systems. In the present instance, damping is obtained from a signal proportional to the difference in instantaneous velocity between master and follower, such signal being obtained from master and follower tachometer generators connected in bucking relationship in a control circuit.

Any desired speed ratio between master and follower output shafts is obtained as a result of the ratios employed to drive master and follower synchros, since a synchronous relationship obtains when master and follower synchros are rotating at a one-to-one speed relationship, or in unison. Thus, if the identical ratio is employed to drive the master synchro from its output shaft as is employed to drive the follower synchro from its output shaft, the speed of the two output shafts will bear a one-to-one ratio.

The illustrations of the application of the invention to effect the synchronous operation of a plurality of conveyors, bring out certain other important advantages of the invention, particularly its flexibility. A number of variables are present in the conveyor field which constitute an obstacle of the general application of any system of speed synchronization. As between any two conveyors whose synchronous operation could be conceivably desirable, there can exist any number of differences or combination of differences, such as length, relative speed, relative loading, relative size, number of driving units employed (any one conveyor may be propelled by a plurality of driving units). Each separate conveyor will present its own variables in the form of chain stretch, unequal load, unequal distribution of load, etc.

Furthermore, the conveyor field well illustrates the application of the system of the invention to the synchronous operation of propelled members, for in this field one of the most common and critical applications for any system of speed synchronization is that of maintaining a synchronous relationship between conveyors of the type which employ spaced carriers, where the object to be attained is to have a carrier on each separate conveyor reach a common reference station, frequently a transfer point, at precisely the same time. In some instances it may be desirable to have the carriers on the separate conveyors reach this common reference station with a constant time difference.

A more extended discussion of the application of the system of the invention and its operation will be given in connection with the specific examples thereof illustrated in the accompanying drawings which comprise the views listed below. Since the individual component parts of the systems illustrated are each well-known commercially available articles, these drawings illustrate these parts in schematic fashion only.

Fig. 1 is a schematic illustration of two independent driving units synchronized by the system of the invention. The driving units are designated master and follower and each consists of a prime mover, a variable ratio transmission and a gear reducer, with the ratio of the follower transmission being controlled by a servo device actuated through a control circuit in response to signals obtained by the control elements associated with both master and follower driving units.

Fig. 2 is a schematic illustration of the application of the invention to the control of a plurality of follower units in parallel from a single master. The control elements and control circuit shown in detail in Fig. 1 are here illustrated in box form only.

Fig. 3 is a schematic illustration of the application of the invention to effect the synchronous operation of a pair of conveyors, synchronization being accomplished with respect to a common reference point, located remotely from the respective driving units involved, and so that each individual carrier on the follower conveyor reaches this reference point simultaneously with the arrival of each individual carrier of the master conveyor.

Fig. 3A is a schematic representation of the application of the invention to synchronize a pair of follower conveyors with a single master conveyor.

Fig. 3B is a schematic representation similar to Fig. 3A to show the synchronous operation of a plurality of conveyors in series fashion.

Referring to Fig. 1, the driving unit there labeled "master" consists of a prime mover 10 for driving the output shaft 11 of a reducer 12 through a variable speed transmission 13 of the double-cone pulley type. The ratio between the input shaft 14 and output shaft 15 of this transmission 13 is controlled by an axial shifting of the cone pulleys in response to movement of an adjusting screw indicated by the broken line 16. This adjusting screw 16, in this particular driving unit, is arranged for remote control through the operation of a reversible servomotor 17 connected to main power lines 1 and 2 through leads 18 and 19. The direction and amount of rotation of the servomotor 17 is governed by the operation of a switch 20 interposed in lead 18. Thus the speed of the output shaft 11 of this driving unit is variable within the range of operation of the variable ratio transmission 13.

The driving unit designated "follower" is similar in type, though not necessarily similar in the size of its component units, to the master driving unit and consists of a prime mover 10f driving the main output shaft 11f of a reducer 12f through a variaable speed transmission 13f. The ratio between the input shaft 14f and output shaft 15f of this transmission is controlled by an adjusting screw 16f and a reversible servomotor 21 is employed to establish the position of the adjusting screw 16f so that the speed of the output shaft 11f will be synchronized with the speed of the master output shaft 11. Any energization of the servomotor 21 necessary to maintain this synchronization is determined in direction and amount by a control circuit enclosed within the dotted line 22 in response to the phase and magnitude of any error signal received from the main control element.

As previously mentioned, this main error-sensing device consists of two synchros, with the master synchro being employed as a generator 23, and the follower synchro being employed as a control transformer 24. The rotor 25 of the generator 23 is mechanically driven from the main output shaft 11 of the master drive unit, this driving connection being indicated by a driving sprocket 26, a driven sprocket 27 and a chain 28. The rotor 25f of the control transformer 24 is similarly mechanically driven from the main output shaft 11f of the follower driving unit through a pair of sprockets 26f and 27f and a chain 28f. The stator 29 of the generator 23 has its three terminals 30, 31 and 32 connected to the corresponding terminal 30f, 31f and 32f of the stator 29f of the control transformer 24 by leads 33, 34 and 35.

If the position of the rotor 25f of the control transformer 24 corresponds at all times with the position of the rotor 25 of the generator 23, no voltage will be induced in the rotor 25f. If, however, the rotor 25f does not correspond in instantaneous position to that of the rotor 25, a voltage will be induced, which voltage will depend in magnitude upon the angle of relative position difference between the rotors, and which will depend in phase upon whether the rotor 25f is lagging or leading the rotor 25. This error voltage is delivered to terminals 36 and 37 of the control circuit through leads 38 and 39.

Thus it will be seen that the rotor 25 of the generator 23 of the master unit must rotate at the same speed as the rotor 25f of the control transformer 24 of the follower drive unit in order for a synchronized relationship to be maintained between the units. The specific speed ratio between master and follower main output shafts 11 and 11f, however, will depend upon the relative ratios employed to drive the synchro devices—these ratios being established, in this instance, by the sprockets 26 and 27 and 26f and 27f, respectively. Depending upon the ratio selected for these sprockets, any desired speed ratio can be established and maintained between the main output shafts 11 and 11f, throughout the speed range of the master and follower driving units. With this speed relationship established, any minute departure of the speed of the follower output shaft 11f therefrom will be reflected in a phase angle difference between the rotor 25f and rotor 25, and this phase angle difference will increase with the length of time the speed error exists.

Fig. 1A graphically illustrates this operation by depicting the magnitude of the error voltage induced in the rotor 25f of the control transformer, as shown by the curve labeled error voltage, with varying degrees of phase angle difference between the relative position of the rotor 25f and the position of the rotor 25 of the generator 23.

Damping of this error signal to prevent hunting is accomplished in the embodiment of the invention illustrated in Fig. 1 by including a second error signal proportional to the instantaneous speed difference between the master and the follower. A tachometer generator 40 is shown driven at a ratio established by pulleys 41 and 42 from the output shaft 15 of the variable speed transmission 13 of the master unit. A similar tachometer generator 40f is driven from the output shaft 15f of the variable speed transmission 13f of the follower unit through pulleys 43 and 44. The ratios at which these two tachometer generators are driven is such that the generator outputs are approximately equal when master and follower driving units are operating at the desired speed ratio. Since the output of these generators varies as a straight-line relationship with their speed, their outputs will remain in equality over any normal range of synchronous speed relationship of the master and follower driving units.

The particular tachometer generators employed in the illustrated application of the invention, Fig. 1, are of the A. C., variable frequency type, and the output of each is passed through a rectifier network to obtain a resultant D. C. voltage. Thus the output of the master tachometer generator 40 is fed through leads 45 and 46 to the terminals 47 and 48 of the rectifying network 49, and the output of the follower tachometer generator 40f is fed through leads 50 and 51 to the terminals 52 and 53 of a similar rectifying network located within the control panel 22.

These rectifying networks each include a transformer 54, a rectifier 55, a speed-indicating meter 56 and master and follower potentiometers 57 and 57f, respectively. The negative terminals 58 and 59 of the master and follower rectifier networks are connected through the terminal 60 of the control panel, and the positive terminal 61 of the master rectifier network is connected by a lead 62 to terminal 63 of the control panel. Any difference between the output of the two tachometer generators will appear as a voltage difference between terminal 63 and terminal 64 of the potentiometer 57f.

Any error signal induced in the rotor 25f of the control transformer 24 appears in the secondary coil of a transformer 65, the primary of which is connected to the terminals 36 and 37. For simplicity this error signal will be referred to hereinafter as the cumulative velocity error signal, while the potential difference between the output of the tachometer generators will be referred to as the instantaneous velocity error signal, or damping signal.

The control circuit proper employed to translate any cumulative and/or instantaneous velocity error signals into corrective operating movement of the servomotor 21 includes a phase detector, illustrated in the form of a double triode or discriminator tube 66, having an upper element 67 and a lower element 68, and means for amplifying a signal passed by either element of this tube to result in energization of either field of the servomotor 21. These means are here illustrated in the form of magnetic amplifiers.

For the purpose of this discussion of the control circuit it will be assumed that the connections between the various component parts thereof are arranged such that, when the upper element 67 of the tube 66 is conducting, the signal so passed will produce an energization of the servomotor 21 such as to raise the output speed of the follower. Conversely, when the lower element 68 is conducting, such signal will result in an energization of the servomotor 21 in a reverse direction to lower the speed of the follower unit.

The control portion of the circuit is powered from the main supply lines 1 and 2 through leads 69 and 70 connected to the terminals 71, 72 of the control panel, and current so supplied passes through a switch 73 and indicator lamp 74 to the primary of a transformer 75. Taps 76 and 77 from the secondary of this transformer supply current to the filament 78 of the tube 66.

A negative rectified bias voltage is supplied to the grids of the tube 66, a potentiometer 79 being included in this network so that the value of this bias voltage can be controlled. The bias voltage is supplied through lead 80 from the potentiometer 79 and appears in the circuit at the point 81. Leads 82 and 83 to point 84 and lead 85 to point 86 establish a potential difference between that last-named point and the cathodes of the tube 66.

The cumulative velocity error signal appearing in the secondary of the transformer 65 is connected in series with the instantaneous velocity error signal appearing across terminals 63—64 by lead 87; and, by a connection 88 between the secondary and a connection 89 to the terminal 64, any combined error signal appears across the points 90 and 91 in the circuit. Point 90 is connected to the upper grid 92 of the tube 66 and the point 91 is connected to the lower grid 93 of the tube. These two points 90 and 91 are also connected to point 81, where appears the negative bias voltage, with equal resistances 94 being included in the connection. This portion of the circuit around the points 90 and 91, including the error signals, can conveniently be referred to as the signal portion thereof; and, as previously mentioned, the connections between this portion of the circuit and the source of the error signals will be assumed to be such that the voltage on the upper grid 92 of the tube 66 will be reduced, causing this portion of the tube to become conducting, when instantaneous velocity of the follower is less than that of the master and/or when the follower lags the master. When either or both of these error signal conditions are reversed, the resulting effect upon the circuit will be that of tending to decrease the voltage on the lower grid 93 to make that portion of the tube more conductive.

Any current passed as a result of the upper element 67 of the tube becoming conducting is fed through lead 95 to the primary of the saturable coil reactor 96 and from the secondary thereof to terminal 97 of the control panel. Lead 98 connects this terminal to the terminal 99 of the servomotor 21. Likewise, any current passed when the lower element 68 of the tube becomes conducting is fed through lead 100 to the primary of another saturable coil reactor 101, from the secondary thereof to control panel terminal 102 which is connected by lead 103 to the other field terminal 104 of the servomotor 21.

Assuming that for some reason the speed of the follower main output shaft 11f varies from a synchronous relationship with that of the master output shaft 11 and increases with respect thereto, this increase will have the immediate effect of increasing the output of the follower tachometer generator 40f. With the master and follower tachometer generators and their rectifier networks properly interconnected, this increase in follower generator output will result in the potential of point 64 becoming greater than that of point 63. Consequently, the potential at point 91 will become less than that at 90, the voltage on the lower grid 93 will be reduced and this portion of the tube will become more conductive. If sufficient current is passed, which depends upon the sensitivity of the tube as controlled by the amount of bias voltage used, and, of course, the magnitude of the velocity error, an energization of the field terminal 104 of the servomotor 21 will result. Usually, however, unless an over-all speed change of the master is being made and is responsible for the aforementioned instantaneous velocity error, the error will not be great enough to cause an immediate speed correction.

The immediate reaction of such a small increase of follower speed upon the phase-angle difference between the rotor 25f of the follower control transformer compared to the rotor 25 of the master generator will be negligible, but as this speed differential continues in time, the rotor 25f will gradually and increasingly lead the position of the rotor 25. An error voltage of one phase and of increasing magnitude will be induced in the rotor 25f, as shown by Fig. 1-A. This leading error voltage is connected into the signal portion of the control circuit so that its effect will be added to that of the instantaneous velocity error voltage and will tend to make the lower element 68 of the tube 66 conducting.

When the servomotor 21 is energized through its field terminal 104 to vary the ratio of the variable speed transmission 13f by adjusting the position of the speed adjusting screw 16f thereof, and reduce the speed of the output shaft 11f, this speed change will produce an immediate change in the output of the follower tachometer generator 40f. The difference in potential between follower and master tachometer generators is therefore either decreased or, if sufficiently decreased, reversed in polarity to thus dampen the action of the cumulative speed error voltage of the rotor 25f from the control transformer 24.

Any decrease in speed of the follower output shaft 11f with respect to that of the master output shaft 11 will naturally work with opposite effect upon the control circuit, the resultant instantaneous and cumulative velocity error signals each acting to decrease the voltage on the upper grid 92 to cause the upper element of the tube to become conducting, and to result in an energization of the other field of the servomotor 21 through the terminal 99 thereof.

The foregoing description of the interrelationship between the control elements of master and follower driving units, and the operation of the speed controlling device of the follower unit by a servomotor acting in response to error signals received from the control elements, is common to any application of the system of the invention. This can perhaps be better appreciated from a consideration of Fig. 2, which schematically depicts the association of elements necessary to obtain the operation of two independent driving units in synchronous relation with a single master unit. This type of operation has been referred to herein as parallel operation, and with this type, any number of follower units can be operated in synchronism with a single master, with the relationship of any particular follower to the master having no necessary dependency upon the relationship of any other follower therewith.

In Figure 2, mechanical connections between the various parts are indicated by broken lines, while electrical connections are indicated in full. The master driving unit comprises a prime mover 105 driving a device 106 which may be a load and/or a speed controller, through a mechanical connection 107. If the device 106 is merely a load, a one-speed system results. If the device 106 is only a speed controller, the master unit is then simply a small scale unit for remotely controlling the operating speed of a plurality of independently driven devices. For example, in the conveyor field, it could be a small unit located in a superintendent's office for controlling the speed of a conveyor or system of conveyor drives. If the device 106 is both a load and a speed controller, the master unit is a full-scale working device whose operation is to control the operation of a number of followers over a speed range.

The master controlling units, as before, consist of a synchro generator 108 driven by the mechanical connection 109 and a tachometer generator 110 driven through the mechanical connection 111.

Follower unit No. 1 is comprised of a prime mover 112 driving a load 113 through a speed controller 114 and mechanical connection 115. A reversible servomotor 116 is mechanically connected at 117 to the speed controller 114 to regulate the speed at which the load is driven by the prime mover. Here the control elements are a control transformer 118 driven through a mechanical connection 119 and a tachometer generator 120 driven through a mechanical connection 121.

Follower unit No. 2 consists of a prime mover 122 driving a load 123 through a speed controller 124 and mechanical connections 125. No necessary interrelationship exists with respect to the size and/or type of the various prime movers, loads, or speed controllers of the system, except, of course, that the prime movers be capable of producing sufficient torque to drive their respective loads throughout the speed range of the system. The operation of the speed controller 124 is also governed by a reversible servomotor 126 acting through a mechanical connection 127. The control devices consist of a control transformer 128 driven through a mechanical connection 129 and a tachometer generator 130 driven through a mechanical connection 131.

In setting up the system, the same criterion applies with respect to the ratio employed in the mechanical connections 109, 119 and 129, for driving the synchro generator and control transformers as previously explained—that is, with the system operating at a synchronous speed condition, the rotor of each of these devices must be turning at the same speed. Likewise, the output of the various tachometer generators must be equal at a synchronous speed condition as determined by the ratios employed in the mechanical driving connections 111, 121 and 131.

The rotor of the synchro generator 108 is energized from main supply lines 132 and 133 by electrical connections 134 and 135. The stator leads of the generator 108 are joined to the corresponding stator leads of the control transformer 118 by connections 136, 137 and 138, and are also joined to the corresponding stator leads of control transformer 128 by connections 139, 140 and 141.

Each of the servomotors 116 and 126 is actuated in response to a signal received through an individual control circuit, similar in all respects to the control circuit described in Fig. 1 and previously explained. In Fig. 2 these control circuits have been indicated in the form of a box only but the leads to the circuits from the power source, the control or error-sensing devices, and from the circuits to their respective servomotors, have been indicated in substantially the same relative position as the corresponding leads shown in Fig. 1. Thus the control circuit No. 1 for the servomotor 116 is powered by leads 143 and 144 from the main power lines 132 and 133, is connected to the master tachometer generator 110 by leads 145 and 146, to the follower tachometer generator 120 by leads 147 and 148, to the rotor of the control transformer 118 by leads 149 and 150, and to the field coils of the reversible servomotor 116 by leads 151 and 152.

Control circuit No. 2 is similarly arranged—powered through leads 153 and 154, connected through leads 157 and 158 to match the output of tachometer generator 130 with the output of the master tachometer generator 110 received through leads 155 and 156, connected to the rotor of control transformer 128 through leads 159 and 160 and to the field of the reversible servomotor 126 through leads 161 and 162.

Thus the control transformers 118 and 128 each independently operate to, in effect, compare the position of their rotor with that of the rotor of the synchro generator 108, and the output of the tachometer generator of each follower is compared to the output of the tachometer generator of the master. Each follower operates precisely in the manner of the system previously described as far as the action of the sensing devices and control circuit is concerned in detecting a speed variance between such follower and the master and in energizing the servomotor for proper corrective action.

Figure 3 illustrates the application of the system of the invention to establish a synchronized relationship between loads at a reference point remote from the driving unit. The conveyor field offers a convenient illustration of this point, and accordingly this view schematically depicts two independently driven conveyor lines 170 and 171, with the conveyor line 170 being arbitrarily selected as a master with which a synchronized relationship of the follower conveyor 171 is to be established. The master conveyor is equipped with a plurality of carriers 172 equally spaced a distance designated $D_M$ and the follower is similarly equipped with a series of carriers 160c equally spaced a distance $D_F$.

It is assumed that in order to satisfy some particular problem in material handling, it is desired to positively synchronize these two conveyors so that a carrier 173 of the follower conveyor will reach a common reference point designated by the broken line 175 simultaneously with the arrival of a carrier 172 of the master conveyor at this point.

A drive unit 176 is employed to propel the master conveyor. This unit may be of any conventional type, and, if it is also desirable to control the speed of the master over a speed range, will be of a type, for example, such as shown in Fig. 1, incorporating a variable speed transmission.

A drive unit 177 is employed to propel the follower conveyor 171. This drive unit will necessarily include some form of speed controlling device adapted to be actuated through the operation of a speed controlling servo device 178.

Actuation of this servo device is in response to a signal obtained from a control circuit 179, such as shown in Fig. 1, in response to a position error signal obtained by the control circuit through leads 180 and 181 from the rotor of a control transformer 182 mounted in a position-sensing unit 183, which includes mechanical means for driving the rotor of the control transformer in response to movement of the conveyor 171. This position-sensing unit 183 is located adjacent to the reference point 175. A similar unit 184, including a synchro generator 185, is associated with the master conveyor 170 and located in substantially corresponding relationship to the reference point 175. The stator of the synchro generator 185 is connected by leads 186, 187 and 188 to the stator of the control transformer 182. Power for energizing the rotor of the synchro generator 185 and the control circuit 179 is not indicated in this view but is employed in a similar manner to that shown in Figs. 1 and 2.

Means to dampen the corrective action of the position error signal is again shown in the form of velocity error signals received from a master tachometer generator 189 driven by a mechanical connection 190 from the master drive unit 176 and connected by leads 192 and 193 to the control circuit 179 so that its output may be compared with the simultaneous output of a follower tachometer generator 194 driven from the follower drive unit by a mechanical connection 195 and connected to the control circuit by leads 196 and 197.

Operation of this type of system is identical to that previously described with respect to error signals and their transformance by the control circuit into corrective actuation of the servo device. In this application of the invention, however, the sensing units 183 and 184 in effect measure the cumulative action of any speed difference between the driving units with respect to a common point established between the loads driven by those units.

The application of the position-sensing units of the invention to a linear moving load such as a conveyor, presents a slightly different concept than does their application to a rotating load such as the drive shafts previously described. The relationship between the master synchro generator unit and the follower control transformer is based primarily upon an increment of movement of their respective loads, rather than merely upon a selected speed ratio.

For example, in a conveyor application of the invention such as illustrated in Fig. 3, synchronization is to be effected with respect to the arrival of the carriers 172 and 173 at the reference station 175. This means that the conveyor 170 whose carriers 172 are separated by the distance $D_M$, must advance that distance in the same amount of time that the carriers 173 of the follower conveyor 171 are advanced the distance of their spacing $D_F$. Thus the rotors of the position-sensing devices 185 and 182 must be driven through an equal amount of rotation while their loads are each advancing the distances $D_M$ and $D_F$, respectively.

While the exact amount of this rotation established by the positioning units 184 and 183, as indicated by the ratio between the sprockets 195 and 196, depends to some extent upon the electrical characteristics of the particular position-sensing devices employed, this ratio is also one of the principal factors in determining the overall sensitivity of the system, which sensitivity is sometimes expressed as a plus or minus allowable position error. For example, if the distance $D_F$ is assumed to be twelve feet and a ratio between the pulleys 195 and 196 is selected so that the rotor of the control transformer 182 makes four turns or complete revolutions during each carrier space, a one degree phase angle difference between this rotor and the rotor of the master synchro generator 185 is equivalent to one-tenth of an inch of position error of a carrier 173 with respect to the reference station 175. With position-sensing devices available which produce an error signal with a few degrees of position difference, it can be seen that the system can be applied to effect a synchronization of this type with a very small allowable tolerance, plus or minus, from perfect synchronization of relative position.

Such synchronization of relative position can also be effected with a constant position difference. This feature is perhaps most clearly illustrated by a conveyor application of the invention where it is often desirable to have a carrier of one conveyor reach a reference station at a certain interval ahead of or behind the arrival of a carrier of another synchronized conveyor, rather than simultaneously therewith. This is illustrated in Fig. 3 where the master and follower conveyors 170 and 171 have each been alternately shown in dotted line and designated by the references 170' and 171', respectively. A carrier 172' of conveyor 170' is shown at the reference station 175 while a carrier 173' of conveyor 171' is spaced a distance S therefrom. If the rotors of the position-sensing devices are properly aligned with the conveyors in this relationship, such position difference will be maintained as part of the synchronous relationship established by the invention.

Figs. 3A and 3B respectively illustrate parallel and series application of the invention in the conveyor field. In Fig. 3A, follower conveyors Nos. 2 and 3 are to be synchronized with master conveyor No. 2 with respect to a common reference station indicated by the broken line 197. Conveyor No. 1 is driven by a driving unit 198, conveyor No. 2 by a driving unit 199, and conveyor No. 3 by a driving unit 200, the units 199 and 200 including a speed varying device controllable by the operation of servo units 201. A master position-sensing unit 202 is shown driven directly from the driving unit 198, as illustrative of the fact that in many applications of the invention, operating conditions will not require any of the sensing units to be located at the point of synchronization. The stator of sensing unit 202 is electrically connected in parallel with the stator of a sensing unit 203, driven by conveyor No. 2, and the stator of a sensing unit 204, driven by conveyor No. 3, any error signal produced by either of the units 203 or 204 is delivered by electrical connections to a control circuit 205 whose output results in corrective energization of the servo device 201 of either driving unit 199 or 200.

In Fig. 3B, conveyor No. 1 is to be synchronized with conveyor No. 2 with respect to a reference station indicated by the broken line 206, while conveyor No. 2 is to be synchronized with conveyor No. 3 with respect to the reference station indicated by the broken line 207. These three conveyors are driven by driving units 208, 209 and 210 respectively, the driving units 209 and 210 necessarily including some means for controlling their output speed, adapted to be regulated by the action of a servo device 211.

To establish synchronization a position-sensing unit 212, incorporating a synchro generator, is located adjacent the reference station 206 and driven by conveyor No. 1. Electrically associated with this unit is a position-sensing unit 213, incorporating a control transformer, located adjacent the reference station 206 and driven by conveyor No. 2. Any position-error signal of this unit 213 is fed to a control circuit 214 through leads 215 and 216, to govern the operation of the servo actuator 211. A second position-sensing unit 217 is driven by conveyor No. 2 at a point adjacent the second reference station 207, and is associated with the similarly placed position-sensing unit 218 driven by conveyor No. 3 which includes a control transformer to establish an error signal governing the operation of the servo actuator 211 through a control circuit 219. Thus conveyor No. 2 is controlled as a follower from conveyor No. 1, and also acts as a master to control conveyor No. 3.

It is understood that some antihunt means, such as the tachometer generator system previously described, would be employed in any application of the system of the invention in order to secure proper operation of the servo device.

The position-sensing unit employed in Figs. 3 and 3A may be considered essentially as a self-contained unit adapted to be used in connection with a driven device, and including a continuously rotatable position-sensing transducer, such as the synchro devices illustrated herein, and means for taking motion from the driven device and imparting such motion into a desired rate or amount of rotation of the position transducer.

We claim:

1. In combination with a driven conveyor member carrying a series of equally lineally spaced elements, and a second independently driven conveyor member carrying a series of equally lineally spaced elements, a control system for maintaining a predetermined relative positioning between an element on each of said driven members comprising a driving unit for said second driven member including a motor, a variable ratio mechanical transmission operably interposed in the driving train between said motor and said second driven member, said transmission having a positionable member controlling the operating ratio thereof, a reversible servomotor operably connected to said positionable member, a continuously rotatable phase sensitive position transducer associated with each of said driven members, means for driving said position transducers to produce equal rotation thereof during the passage of successive elements of their respective driven members, said position transducers being electrically connected to produce an error signal proportional in phase and magnitude to the relative position between an element of said first driven member and an element of said second driven member, and means for energizing said servomotor in response to the phase and magnitude of said error signal.

2. The combination set forth in claim 1 wherein the relative positioning between the elements of said first and second driven members is maintained with respect to a common reference station established between said driven members, the driving means for said position transducers being operably associated with the respective driven members at points adjacent the location of said common reference station.

3. A synchronized conveyor system including a master conveyor and a plurality of follower conveyors, each of said follower conveyors having a driving unit including a motor and a variable ratio mechanical transmission operably interposed in the driving train between said motor and said conveyor, each transmission having a positionable member controlling the operating ratio thereof, a reversible servomotor operably connected to each positionable member, a continuously rotatable phase sensitive position transducer associated with each of said conveyors, means for driving each of said position transducers to establish a one-to-one speed ratio between the transducer of the master conveyor and the transducer of each follower conveyor at the synchronous speed relationship desired between master and each follower conveyor, means electrically connecting the follower transducers in parallel with said master transducer whereby an error signal will be produced in proportion to the phase, magnitude and duration of any speed difference existing between said master conveyor and each follower conveyor, and means for energizing the servomotor of each follower conveyor in response to the phase and magnitude of the error signal between such follower conveyor and the master conveyor.

4. A synchronized conveyor system comprising a main conveyor and at least two successive conveyors, each of said successive conveyors having a driving unit including a motor and a variable ratio mechanical transmission operably interposed in the driving train between said motor and the conveyor, each transmission having a positionable member controlling the operating ratio thereof, a reversible servomotor operably connected to each positionable member, a continuously rotatable phase sensitive position transducer associated with each of said main and first successive conveyors, means for driving each of said position transducers to establish a one-to-one speed ratio therebetween at the desired synchronous speed relationship between said main and first successive conveyors, electrical connections between said transducers whereby an error signal will be produced in proportion to the phase, magnitude and duration of any speed difference existing between said main and first successive conveyors, means for energizing the servomotor of said first successive conveyor in response to the phase and magnitude of said error signal, a continuously rotatable phase sensitive position transducer associated with each of said second and third successive conveyors to form a second pair of transducers, means for driving each transducer of said second pair to establish a one-to-one speed ratio therebetween at the desired synchronous speed relationship between said second and third successive conveyors, electrical connections between said second pair of transducers whereby an error signal will be produced in proportion to the phase, magnitude and duration of any speed difference existing between said second and third successive conveyors, and means for energizing the servomotor of said third successive conveyor in response to the phase and magnitude of the error signal produced by said second pair of transducers.

5. A synchronized conveyor system comprising a plurality of conveyors each having a driving unit including a motor and a variable ratio mechanical transmission operably interposed in the driving train between said motor and the conveyor, each of said transmissions having a positionable member controlling the operating ratio thereof, a reversible servomotor operably connected to each positionable member, a continuously rotatable phase sensitive position transducer operably associated with each conveyor, a master control station including a continuously rotatable phase sensitive position transducer and means for rotating it at a controllable rate, electrical connections between the transducer of said control station and the transducer of at least one of said conveyors whereby an error signal will be produced relative to the phase, magnitude and duration of any speed difference between said electrically connected transducers, and means for energizing the servomotor of the driving unit of the conveyor of said electrically connected transducer in response to the phase and magnitude of said error signal.

6. Apparatus for synchronizing the speed of a driven member designated as master with the speed of another independently driven member designated as follower, said follower being independently motivated by a driving unit including a prime mover and a variable ratio mechanical transmission interposed between said prime mover and said follower member, said transmission having a positionable member controlling the operating ratio thereof, a reversible servo actuator operably connected to said positionable member, a continuously rotatable phase sensitive position transducer associated with each of said driven members, means for driving each of said position transducers to establish a one-to-one speed ratio between the transducer of the master member and the transducer of the follower member at the synchronous speed relationship desired between master and follower, means electrically connecting said position transducers whereby an error signal will be produced in proportion to the phase, magnitude and duration of any speed difference existing between master and follower, and control means for energizing said servo actuator in response to the phase and magnitude of said error signal.

7. Apparatus as defined in claim 6 further including means to produce a second error signal proportional to any instantaneous speed difference between said master and follower driven members, said second error signal being applied in said control means to dampen the corrective action of said first-mentioned error signal.

8. Apparatus as defined in claim 6 wherein the means for producing said error signal comprises two electrically interconnected synchros, one associated with and driven by said master-driven member and the other associated with and driven by said follower-driven member, and a transmission between said master and/or follower-driven member and their associated synchros to establish a one-to-one speed ratio between the synchros at a predetermined desired speed relationship between the master and follower-driven members.

References Cited in the file of this patent

UNITED STATES PATENTS

| | | |
|---|---|---|
| 2,062,136 | Marresford | Nov. 24, 1936 |
| 2,076,202 | Lewellen | Apr. 6, 1937 |
| 2,117,484 | Lewellen | May 17, 1938 |
| 2,385,204 | Hanna | Sept. 18, 1945 |
| 2,417,588 | Davis et al. | Mar. 18, 1947 |
| 2,456,508 | Herwald et al. | Dec. 14, 1948 |
| 2,466,035 | McCoy | Apr. 5, 1949 |
| 2,528,575 | Broadbent | Nov. 7, 1950 |
| 2,550,514 | Alexanderson | Apr. 24, 1951 |
| 2,582,222 | Belsey et al. | Jan. 15, 1952 |
| 2,583,058 | Libman | Jan. 22, 1952 |
| 2,583,552 | Edwards | Jan. 29, 1952 |
| 2,634,387 | Mercier | Apr. 7, 1953 |
| 2,638,006 | Feustel | May 12, 1953 |